United States Patent [19]

Bigold

[11] Patent Number: 5,529,497
[45] Date of Patent: Jun. 25, 1996

[54] APPARATUS FOR TEACHING THE ADDITION AND SUBTRACTION OF WHOLE NUMBERS THROUGH THE USE OF OBJECTS

[76] Inventor: Clara L. Bigold, 2444 Hihiwai St. #2002, Honolulu, Hi. 96826

[21] Appl. No.: 315,290

[22] Filed: Sep. 29, 1994

[51] Int. Cl.⁶ .................................................. G09B 1/02
[52] U.S. Cl. ........................................ 434/191; 434/193
[58] Field of Search ................................... 434/191, 193, 434/204, 205, 207, 188

[56] References Cited

U.S. PATENT DOCUMENTS

| | | | |
|---|---|---|---|
| 3,874,096 | 4/1975 | Romstad | 434/205 |
| 4,808,111 | 2/1989 | Pratt | 434/205 |
| 4,884,973 | 12/1989 | Pak | 434/205 |
| 5,040,987 | 8/1991 | Frazier | 434/205 |
| 5,167,505 | 12/1992 | Walsh | 434/205 |

*Primary Examiner*—John S. Hilten

[57] ABSTRACT

Apparatus for teaching the addition and subtraction of whole numbers through the use of objects comprising a sheet with three containers across in a row, the containers of the row being separated by a mathematical sign (+ or −), and the second and third containers being separated by an equals sign (=); and a plurality of objects, the objects being of a similar shape but with distinctive markings thereon; whereby when some of the devices are placed in the first container and others in the second container, the third container may be filled by the child with the objects representing the result of the mathematical process to be performed.

3 Claims, 9 Drawing Sheets

5,529,497

APPARATUS FOR TEACHING THE ADDITION AND SUBTRACTION OF WHOLE NUMBERS THROUGH THE USE OF OBJECTS

BACKGROUND OF THE INVENTION

1. Field of the Invention

The present invention relates to apparatus for teaching the addition and subtraction of whole numbers through the use of objects and, more particularly, pertains to using objects to assist in the teaching of mathematical skills including addition and subtraction.

2. Description of the Prior Art

The use of teaching aides for various subjects including arithmetic is known in the prior art. More specifically, teaching aides for various subjects including arithmetic heretofore devised and utilized for the purpose of using objects for assisting children in learning arithmetic are known to consist basically of familiar, expected and obvious structural configurations, notwithstanding the myriad of designs encompassed by the crowded prior art which have been developed for the fulfillment of countless objectives and requirements.

By way of example, the prior art discloses in U.S. Pat. No. 4,419,081 to Steinmann discloses a mathematical teaching/learning aid and method of use.

U.S. Pat. No. 4,192,085 to Bonorand discloses a teaching aid device for teaching the basic principles of arithmetic.

U.S. Pat. No. 4,553,944 to Flanagan discloses a mathematical teaching device.

U.S. Pat. No. 4,884,973 to Pak discloses a mathematic teaching aid.

U.S. Pat. No. 4,915,634 to Hedden discloses a visual and manipulative teaching aid for mathematics.

In this respect, the apparatus for teaching the addition and subtraction of whole numbers through the use of objects according to the present invention substantially departs from the conventional concepts and designs of the prior art, and in so doing provides an apparatus primarily developed for the purpose of using objects to assist in the teaching of mathematical skills including addition and subtraction.

Therefore, it can be appreciated that there exists a continuing need for new and improved apparatus for teaching the addition and subtraction of whole numbers through the use of objects which can be used for using objects to assist in the teaching of mathematical skills including addition and subtraction. In this regard, the present invention substantially fulfills this need.

SUMMARY OF THE INVENTION

In view of the foregoing disadvantages inherent in the known types of teaching aides for various subjects including arithmetic now present in the prior art, the present invention provides an improved apparatus for teaching the addition and subtraction of whole numbers through the use of objects. As such, the general purpose of the present invention, which will be described subsequently in greater detail, is to provide a new and improved apparatus for teaching the addition and subtraction of whole numbers through the use of objects apparatus and method which has all the advantages of the prior art and none of the disadvantages.

To attain this, the present invention essentially comprises a new and improved apparatus for teaching the addition and subtraction of whole numbers through the use of objects comprising, in combination: a sheet with three containers across a first row and three containers across a second row, the containers of the first row are separated by a plus sign (+) and the second and third containers are separated by an equals sign (=); the second row is formed of three containers with a negative sign (−) located between the first and second containers and an equals sigh (=) between the second and third containers; and a plurality of objects, the objects being of a similar shape but with distinctive markings thereon; whereby when some of the objects are placed in a first container and others of the object are placed in the second container, the third container may be filled by the child with objects representing the mathematical process to be performed.

There has thus been outlined, rather broadly, the more important features of the invention in order that the detailed description thereof that follows may be better understood, and in order that the present contribution to the art may be better appreciated. There are, of course, addition and subtraction features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved apparatus for teaching the addition and subtraction of whole numbers through the use of objects which has all the advantages of the prior art teaching aides for various subjects including arithmetic s and none of the disadvantages.

It is another object of the present invention to provide a new and improved apparatus for teaching the addition and subtraction of whole numbers through the use of objects which may be easily and efficiently manufactured and marketed.

It is a further object of the present invention to provide a new and improved apparatus for teaching the addition and subtraction of whole numbers through the use of objects which is of a durable and reliable construction.

An even further object of the present invention is to provide a new and improved apparatus for teaching the addition and subtraction of whole numbers through the use of objects which is susceptible of a low cost of manufacture with regard to both materials and labor, and which accordingly is then susceptible of low prices of sale to the consuming public, thereby making such teaching aides for various subjects including arithmetic s economically available to the buying public.

Still yet another object of the present invention is to provide a new and improved apparatus for teaching the addition and subtraction of whole numbers through the use of objects which provides in the apparatuses and methods of the prior art some of the advantages thereof, while simultaneously overcoming some of the disadvantages normally associated therewith.

Still another object of the present invention is to using objects to assist in the teaching of mathematical skills including addition and subtraction.

Lastly, it is an object of the present invention to provide new and improved apparatus for teaching the addition and subtraction of whole numbers through the use of objects comprising a sheet with three containers across in a row, the containers of the row being separated by a mathematical sign (+ or −), and the second and third containers being separated by an equals sign (=); and a plurality of objects, the objects being of a similar shape but with distinctive markings thereon; whereby when some of the devices are placed in the first container and others in the second container, the third container may be filled by the child with the objects representing the mathematical process to be performed.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numeral refers to the same part throughout the various Figures.

DESCRIPTION OF THE PREFERRED EMBODIMENT

Figure 1:
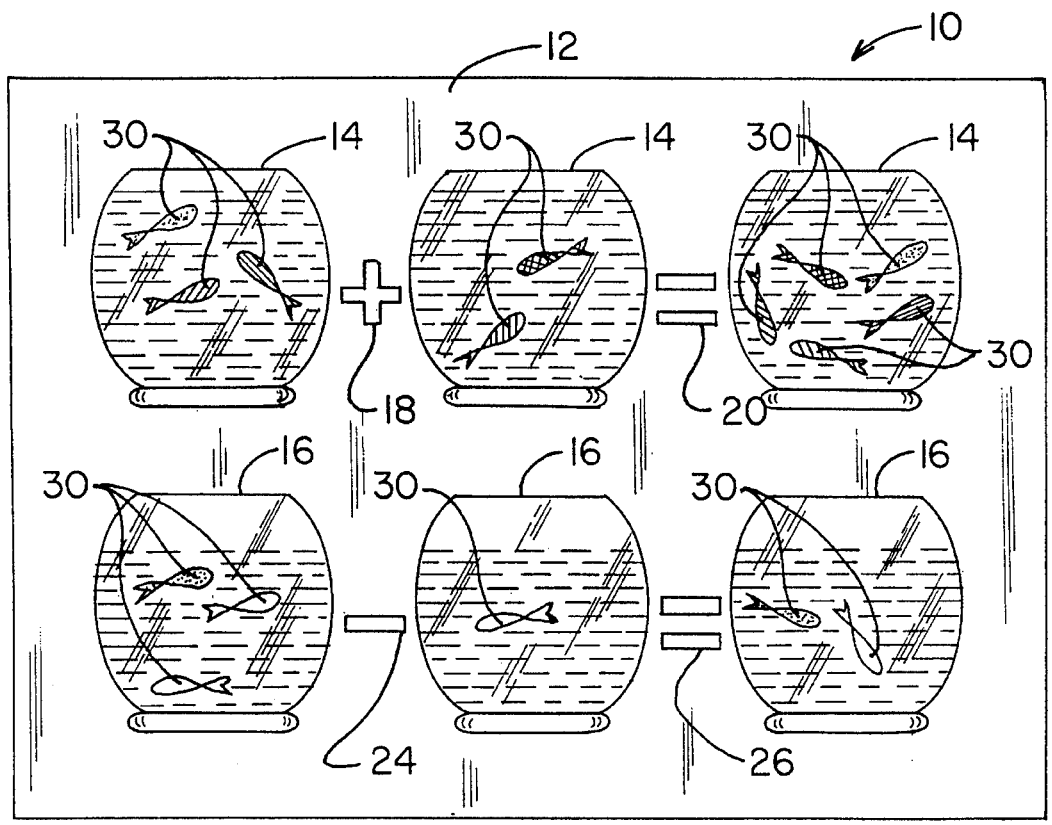
FIG. 1 is a front elevational view of the preferred embodiment of the new and improved apparatus for teaching the addition and subtraction of whole numbers through the use of objects constructed in accordance with the principles of the present invention.

With reference now to the drawings, and in particular to FIG. 1 thereof, a new and improved apparatus for teaching the addition and subtraction of whole numbers through the use of objects embodying the principles and concepts of the present invention and generally designated by the reference numeral 10 will be described.

The present invention, the new and improved apparatus for teaching the addition and subtraction of whole numbers through the use of objects is a system 10 comprised of a plurality of components, such components include, in their simplist terms, a sheet with containers, markings and, in several embodiments, objects. Such components are individually configured and correlated with response to each other so as to obtain the desired objective.

More specifically, the present invention is in a system 10. The system has at its center point a sheet 12. The sheet is formed with three containers 14 across a first row and three containers 16 across a second row. The containers of the first row are separated by a plus sign 18 (+). The second and third containers are separated by an equal sign 20 (=). The second row is formed with three containers have a negative sign 24 (−) located between the first and second containers. In addition, an equal sign 26 (=) is located between the second and third container.

In addition to the sheet with containers, there are provided a plurality of objects 30. The objects are of a similar shape. They are from, whoever, with distinctive makings, preferably different colors, on their exterior surfaces for being viewed.

In this manner, when some of the objects are placed in a first container of one row and others of the objects are placed in the second container of the same row, then the third container may be filled by a child with an object or objects representing the mathematical process to be performed.

FIG. 1 is a demonstration of adding three plus 2 and arriving at the result of five. The second row in FIG. 1 represents mathematical process of starting with three fish, subtracting one and coming to the result of two.

Figure 2:
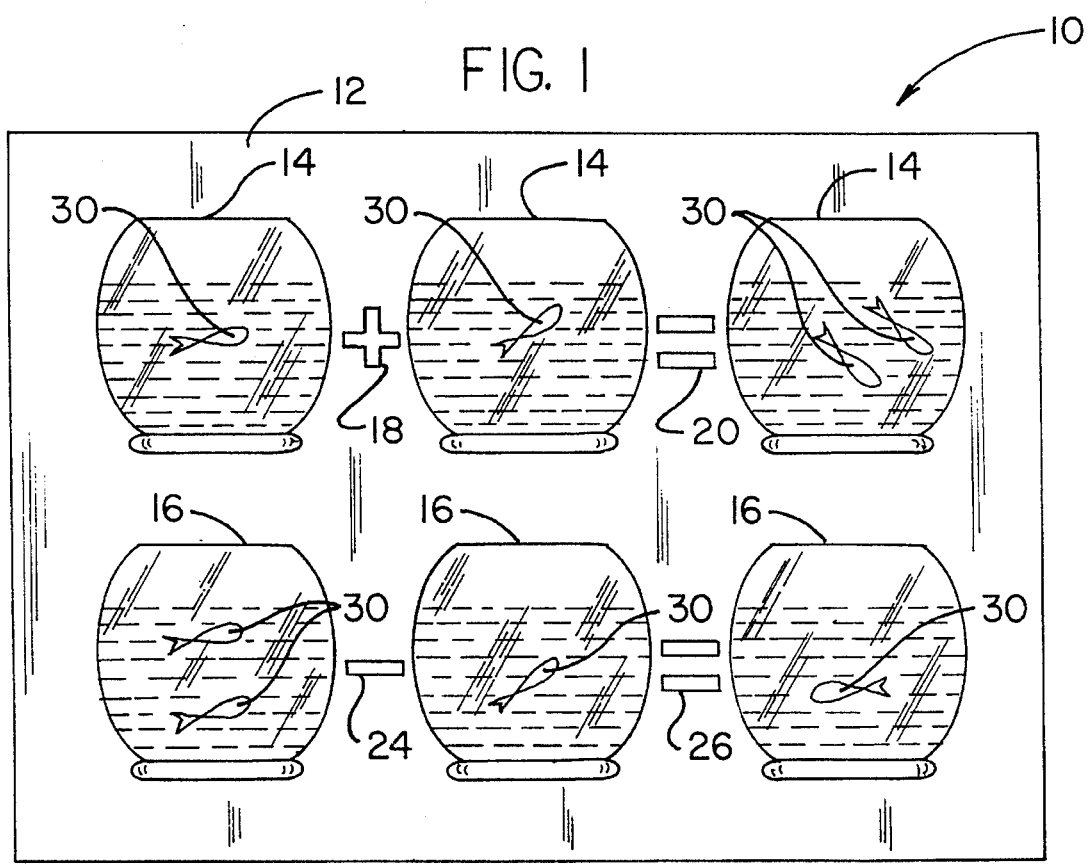
FIG. 2 is a front elevational view of the device similar to that of FIG. 1 but illustrating subtraction rather than addition.

FIG. 2, like FIG. 1 involves the use of fish bowls as the containers and fish as the objects to be added or subtracted. In FIG. 2, the top row relates to adding one and one and having the result of two. FIG. 2 involves starting with two, subtracting one and coming to the result of one. FIGS. 1 and 2 are thus directed to the same objects and containers but with different mathematical functions being performed.

Figures 3, 4:
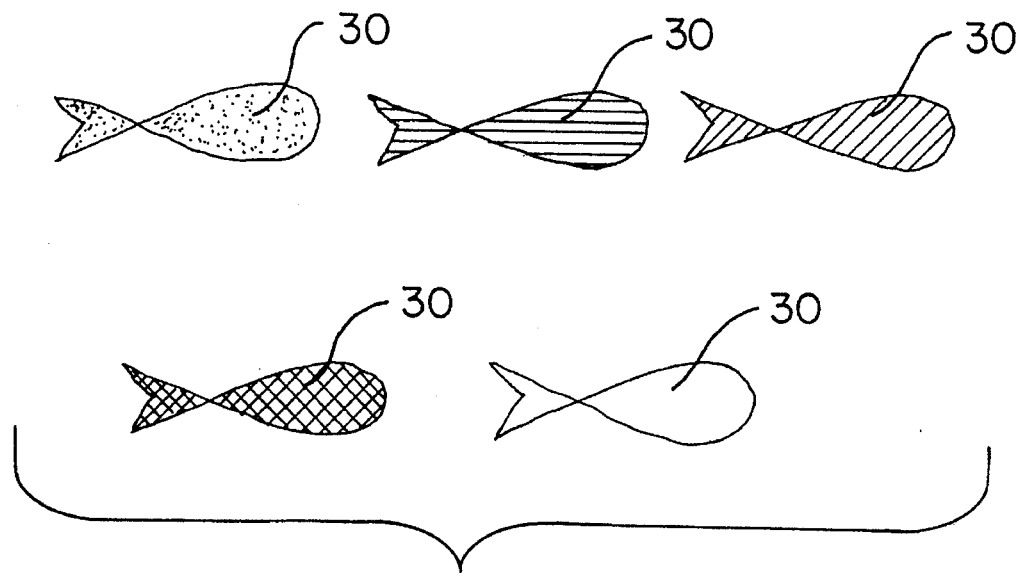
FIG. 3 shows a plurality of fish adapted for use in association with the devices of FIGS. 1 and 2 to visually represent addition and subtraction.
FIG. 4 is a sheet of numerals in a grid configuration used to teach addition.

FIG. 3 shows a variety of different objects, fish, which may be used in association with the embodiments of FIGS. 1 and 2.

Figure 7:
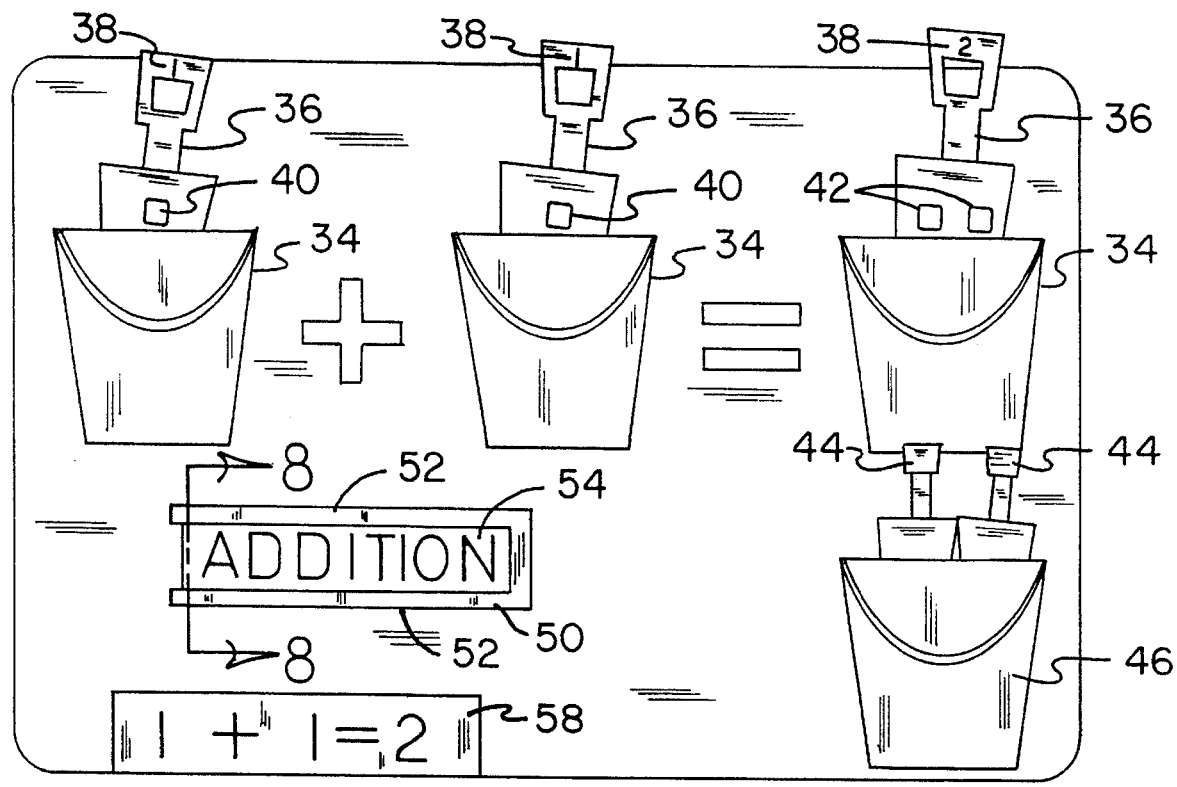
FIG. 7 is a device used to make a visual representation of addition.
Figure 8:
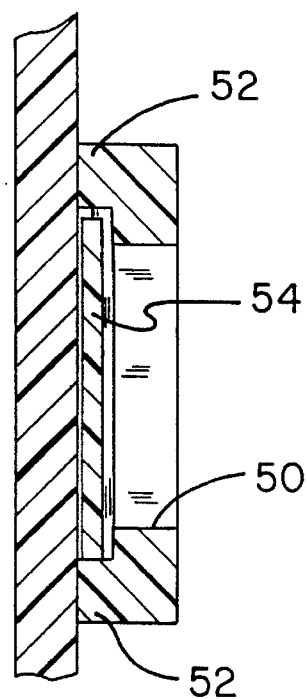
FIG. 8 is a cross-section taken along line 8—8 of FIG. 7.

The next closest embodiment of to that of FIGS. 1 and 2 is the embodiment disclosed in FIGS. 7 and 8.

In such embodiments, the containers are buckets 34 and the objects are shovels 36. In such embodiments, each shovel is provided with a marking 38, the marking being one or more squares representing the numbers one or more, the number corresponding to the number of markings. Consequently, in the first row of FIG. 7, there is added a shovel each with one marking 40 and with the final shovel in the upper right having two markings 42. This corresponds to the addition of one marking plus one marking equals two markings. Beneath the upper right hand bucket and shovel is another representation of the answer, two shovels 44 and a common bucket 46.

In the embodiment of FIGS. 7 and 8, a shallow pocket 50 is formed of parallel side walls 52. Such side walls are adapted to removably receive information relating to the mathematical process being performed. In FIG. 7 and 8, the additional material is the word "addition" on a card 54. The card may be added to the sheet material 56 of this embodiment to indicate the mathematical process being demonstrated and performed. In addition, an additional sheet 58 is preferably provided to represent the mathematical process performed in mathematical type language.

Figure 5:
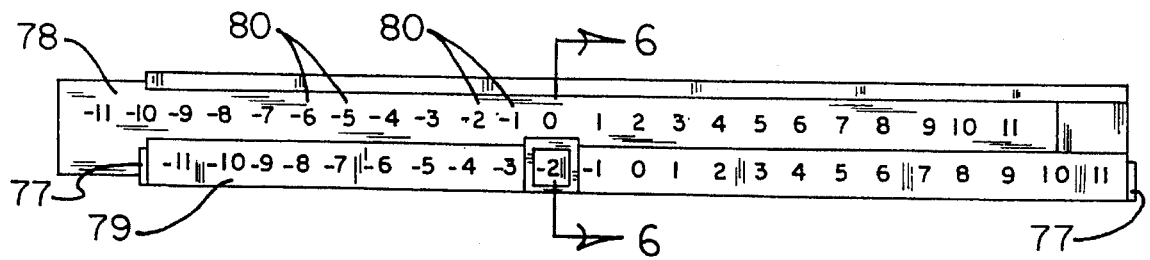
FIG. 5 is a device similar to that in FIG. 4 but used in linear form.
Figure 6:
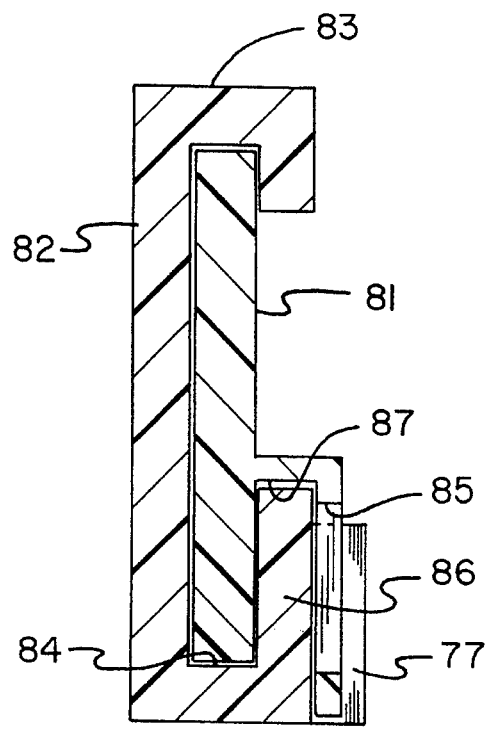
FIG. 6 is a cross-sectional view taken along line 6—6 of FIG. 5.

Alternate embodiments of the invention are disclosed in FIGS. 4 and then in FIGS. 5 and 6. In FIG. 4, there is simply provided the sheet 62. Such sheet, like the materials of the prior embodiments is for teaching the addition and subtraction of whole numbers through the use of objects. The sheet material of the FIG. 4 embodiment is simply a plurality of numbers 66 in rows 68 and columns 70. The rows and columns have numbers in linear configuration. In this manner, the reading of rows and numbers, taken together will provide a visual representation of a number which is the result of a mathematical step to be performed. The mathematical step to be performed is provided as indicia written across the top of the sheet material.

For example, in adding three plus two, three will be found on the upper row while two will be found on the left hand column. Drawing a line, preferably with a finger at a central portion of the sheet material to couple the three and two with a vertical and horizontal line will result in the number five 74 being found. Sentence five is another representation of the addition of three and two. Addition of any two numbers between zero and nine may be utilized with this technique.

The next embodiment of the invention is disclosed in FIGS. 5 and 6. In such embodiment, two rows of numbers are provided, an upper row 78 and a lower row 79. A larger number of columns 80 of numbers are utilized. The upper row of numbers 78 is printed for viewing in the upper region of front sheet 80. The lower numbers 79 are printed on the back sheet 82 in a lower extent thereof. The back sheet 82 is formed with an upper recess 83 and a lower recess 84 for slidably receiving the front sheet 81. The front sheet has a forwardly and downwardly extending portion forming a window 85 for viewing the lower numbers 79. Lastly, an upwardly extending leg 86 is formed in the back sheet for being received in a recess 87 of the front sheet. In this manner, aligned numbers of the two sheets may be taken in combination with the number in the window to represent a mathematical step to be performed by way of example, number positive six in the upper row when taken in conjunction with the negative two in the window 85 result in positive four, the number beneath the six. Similarly, the rows may be shifted with respect to each other to have different numbers within the window. A large number of mathematical processes must be performed with the simple device of FIGS. 5 and 6.

Figure 9:
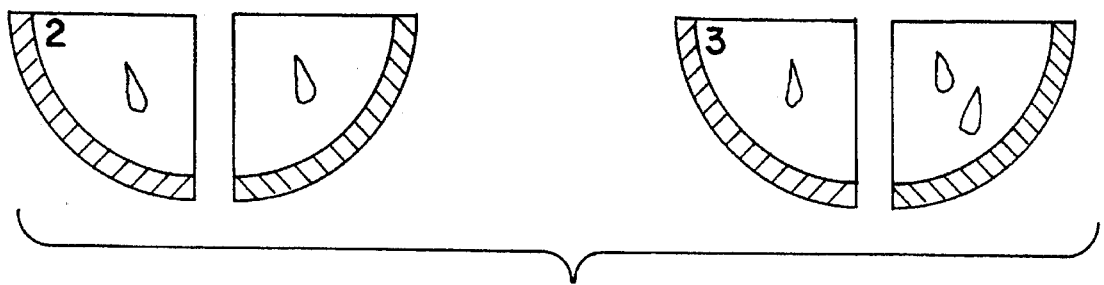
FIG. 9 shows two illustrations of the watermelon puzzle.
Figure 10:
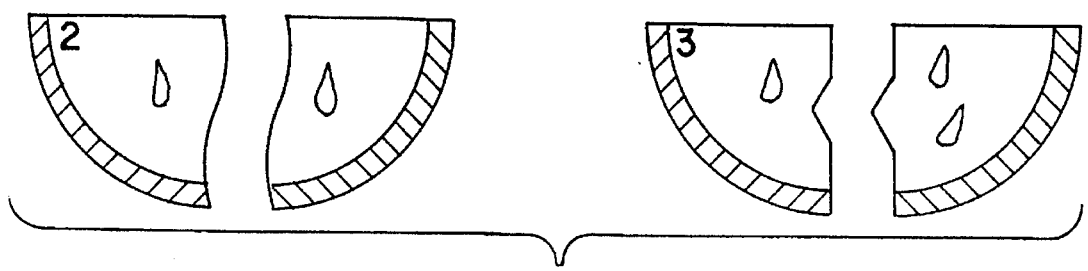
FIG. 10 are two additional illustrations of the watermelon puzzle.
Figure 11:
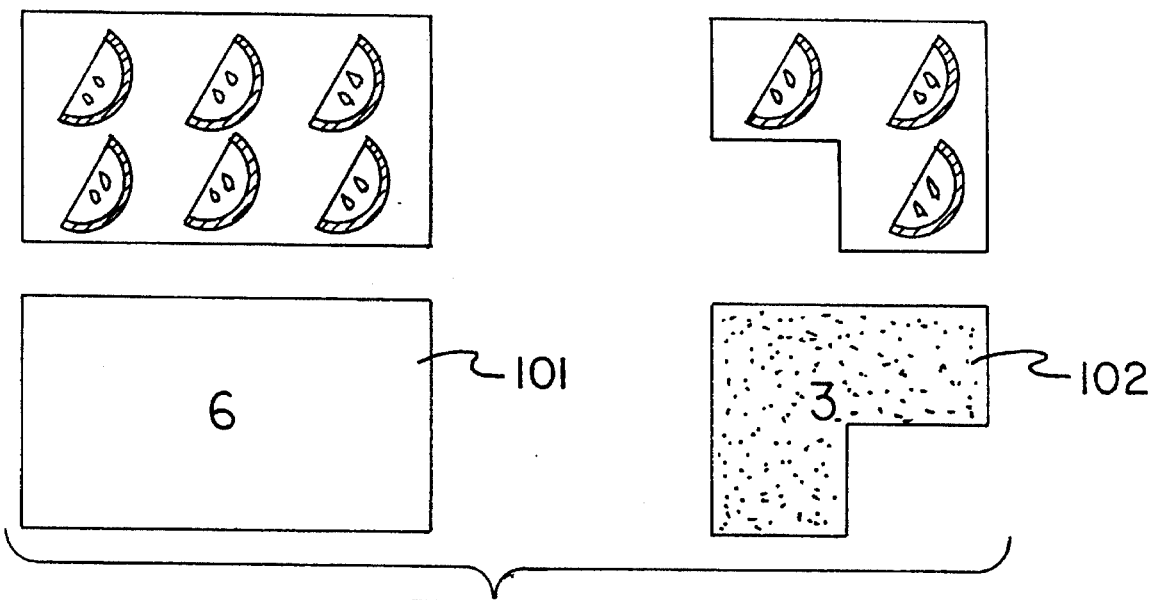
FIG. 11 shows two illustrations of the watermelon blocks.
Figure 12:
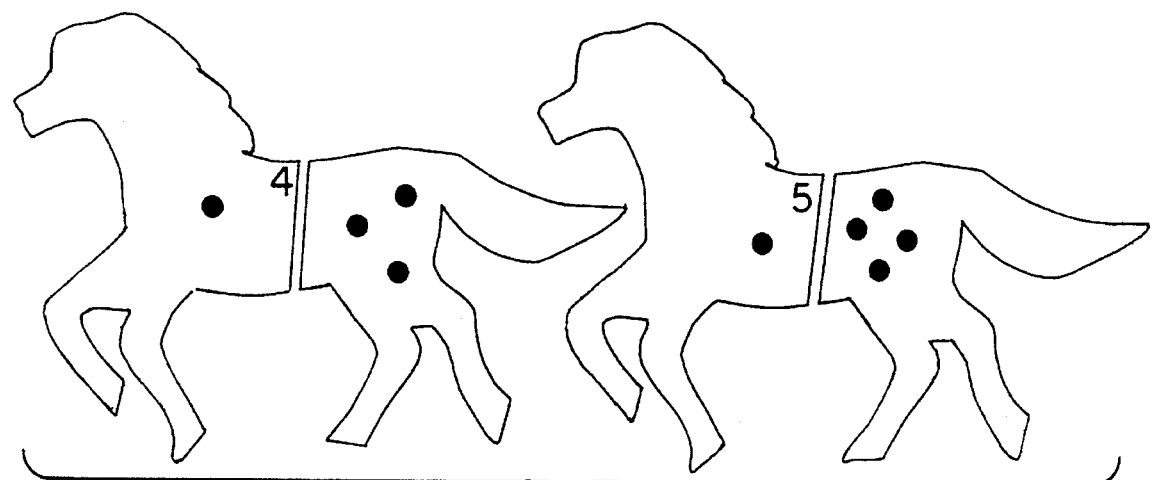
FIG. 12 shows two illustrations of the horse puzzle.
Figure 13:
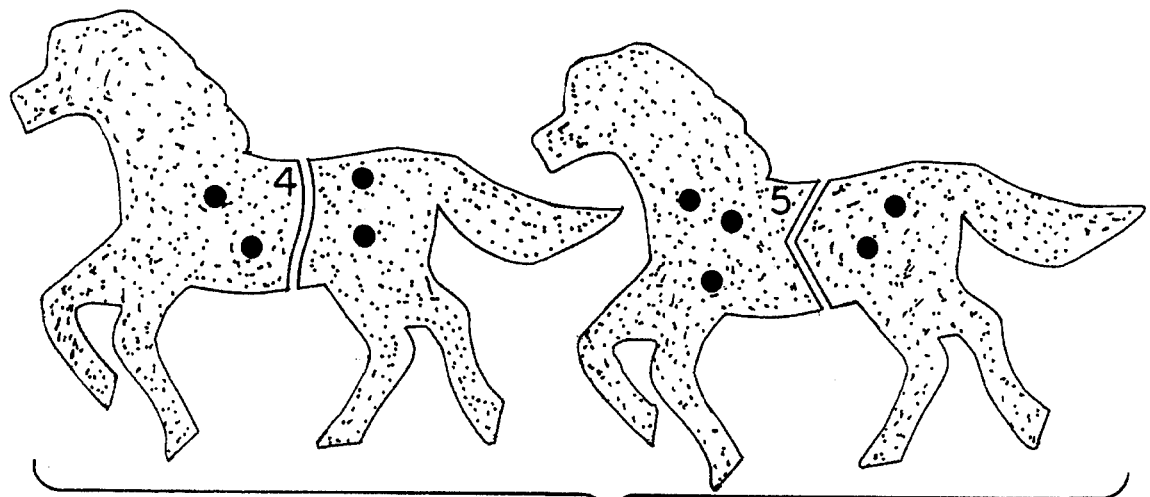
FIG. 13 shows two illustrations of the horse puzzle.
Figure 14:
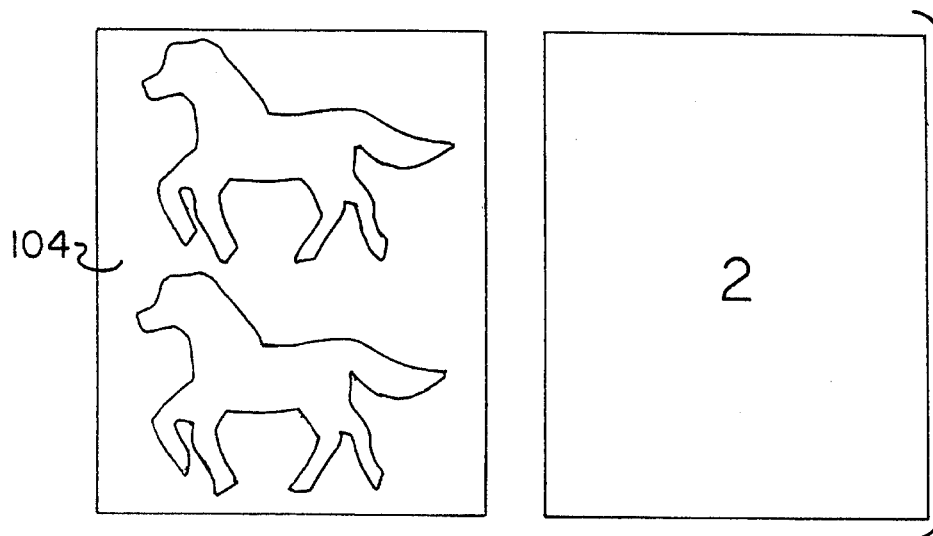
FIG. 14 show one illustration of the horse block, sides front and back.

FIGS. 9 through 11 illustrate the watermelon puzzle while FIGS. 12 through 14 illustrate the horse puzzle. These are manipulative materials for learning the addition and subtraction of whole numbers. The suggested material for such materials is wood. FIGS. 9 and 10 as well as 12 and 13 are self-corrective puzzles. Children will fit the appropriate pieces together whether pair 90, 91, 92 or 93 of the watermelon puzzle or 95, 96, 97 or 98 of the horse puzzle. Thereafter the children can count the watermelon seeds on the watermelon puzzle or the spots on the horses if they are using that set. Note is taken that all the test puzzles are cut the same. Either the child knows it or does not. That is how the teacher or parent knows if the child is learning something from playing with the self-corrective puzzle. If your child is counting the seeds or spots it can be determined or it can be determined that the child is just fitting the pieces together.

Next provided are the watermelon blocks 101 and 102 and the horse blocks 104. Such blocks are also helpful in teaching the addition and subtraction of whole numbers. Even numbered blocks form a rectangle. Odd numbered blocks are one square short of a rectangle shape. Number 9 is the exception where you may use three rows of three. Through this children will discover the following at play:

1) even number plus even number equals even number 2) odd number plus odd number equals even number 3) odd number plus even number equals odd number Corresponding numbers will be on the back of the blocks. Careful cutting is required on this so that all the pieces can work together. All pictures must be going generally in the same direction. The blocks should not be reversed or all the pieces will not work together.

Figure 15:
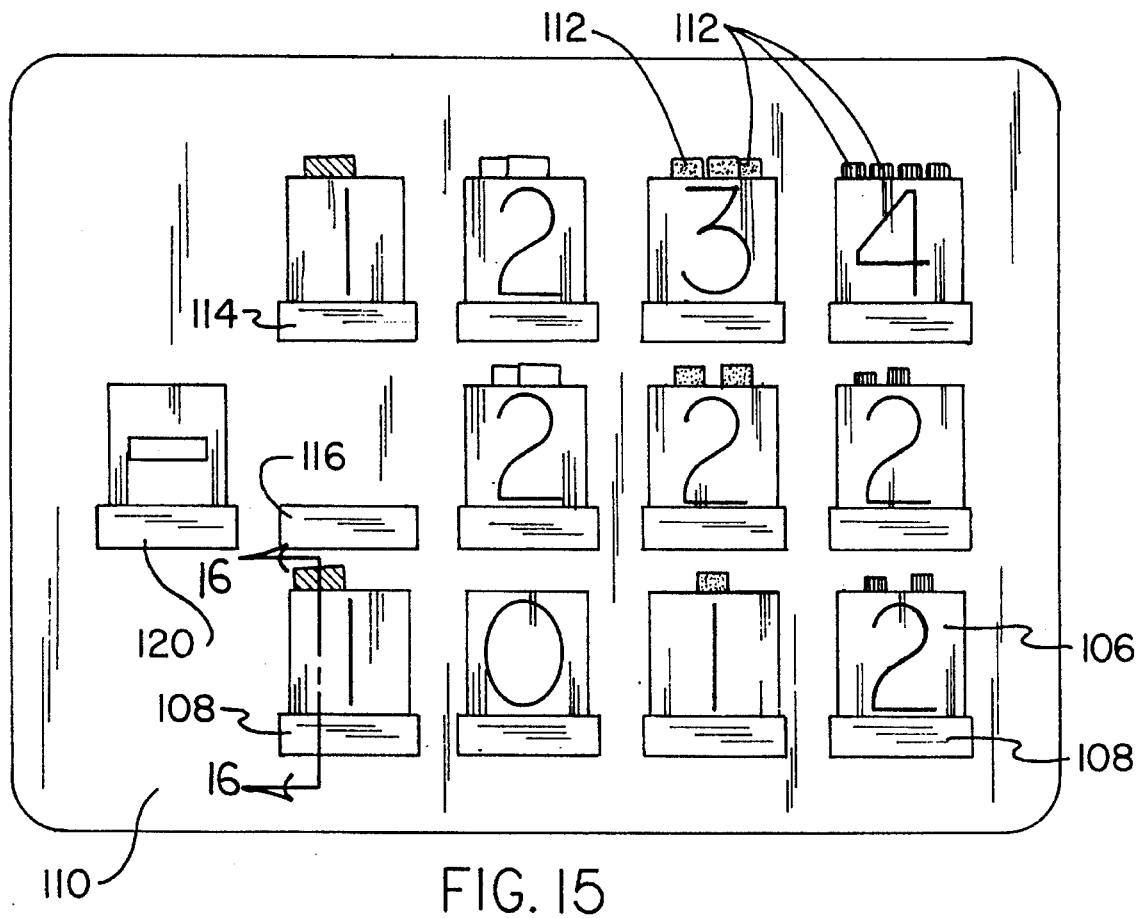
FIG. 15 shows a counting board.
Figure 16:
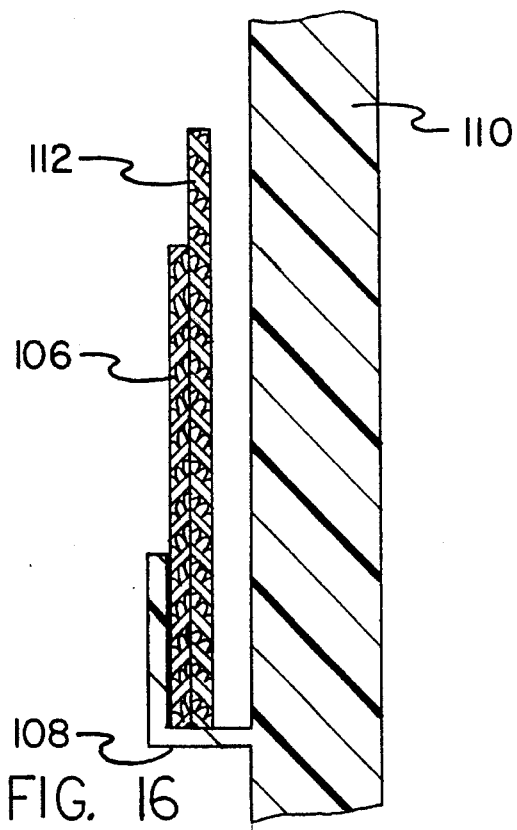
FIG. 16 is a cross-sectional view taken along line 6—6 of FIG. 15.

FIGS. 15 and 16 illustrate an instructional tool for parents and teachers to teach the addition and subtraction of whole numbers. In addition, the addition and subtraction board uses place value markers 106 and number pockets 108. The rows of pockets can be made of durable plastic or wood protruding from the backing board 110. Place value markers 112 are also provided and are made of a durable plastic. Numbers are placed on the cards. There are three rows of pockets, an upper row 114, a middle row 116 and a lower row 118. In addition, a single pocket 120 is provided on the left for the addition or subtraction sign. The last row will include a double pocket for ten thousands place value. The set comes with a set of addition and subtraction problems on cards to be solved. The solution can be place on the back of the cards. The materials for the prototype include:

| Number Cards | Quantity | Place Value | # Markers | Operations |
| --- | --- | --- | --- | --- |
| 0 | 12 | Ones | 36 | + |
| 1 | 8 | Tens | 36 | − |
| 2 | 8 | Hundreds | 36 | |
| 3 | 8 | Thousands | 36 | |
| 4 | 8 | Ten Thousands | 2 | |
| 5 | 8 | | | |
| 6 | 8 | | | |
| 7 | 8 | | | |
| 8 | 8 | | | |
| 9 | 11 | | | |
| 10–19 | 1 each | | | |

18 = 18 ones
= 1 ten and 8 ones

For matching one-to-one, place a marker in the sum for each marker you have for your addends. You now have 18 ones, which can be regrouped as 1 ten and 8 ones.

The sample above shows that the place value markers for the addends are still in the pockets, in that the 18 ones have been traded in for 1 ten and 8 ones. Another way to do this is to take the markers out of these pockets and place them in the solution which leaves 18 ones in the ones pocket. Trade in 10 ones for a tens place value marker and place it in the tens column along with the number 1.

Figure 17:
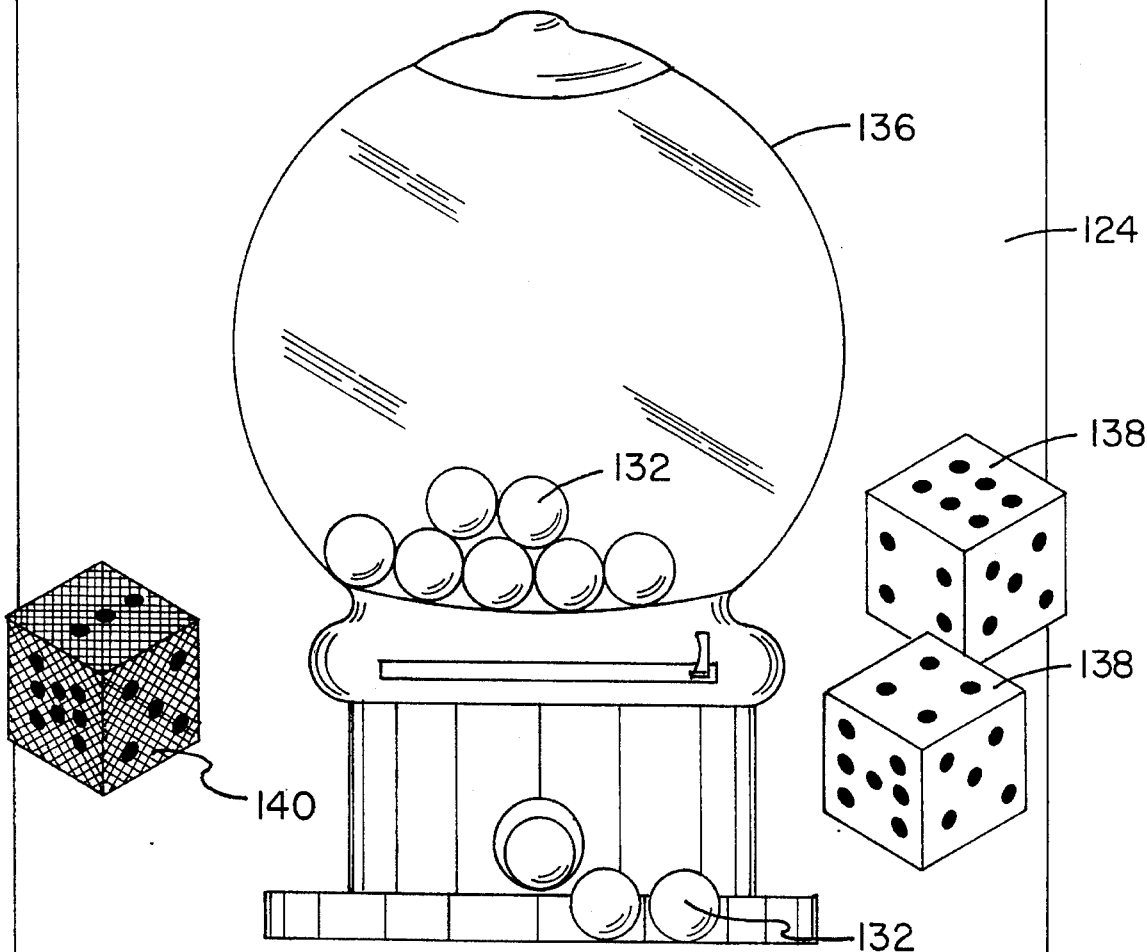
FIG. 17 is an illustration of the gumball game.
Figure 18:
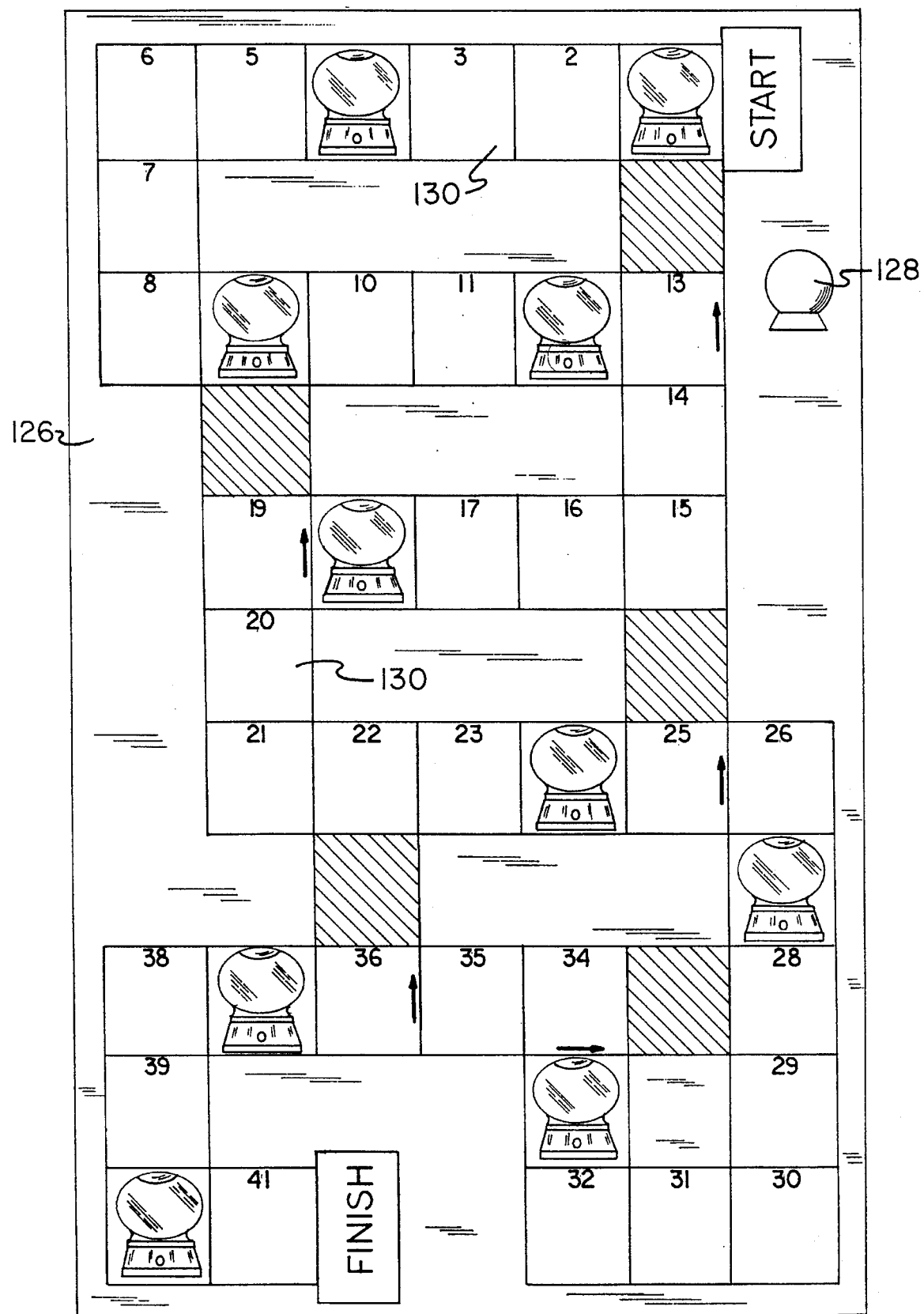
FIG. 18 is an illustration of the gumball board game.

The last aspect of the invention is shown in FIGS. 17 and 18 and includes a gumball machine problem solving board 124 and a game board 126. The game board has a plurality of starting markers 128, preferably five. The starting markers are made of imitation gumballs on durable plastic bases. Each player will take a turn at rolling the dice and moving his or her marker the appropriate number of steps 130. There will be specific directions to follow depending on where the marker lands on the board. If a player lands on a picture of a gumball machine, then the player will have to work on the magnetic gumball machine problem solving board. If solved correctly, the player may advance two steps.

The magnetic gumball machine problem solving board will come with magnetic bubblegum disks 132, numbers, addition and subtraction signs and equal sign. The directions will be on the magnetic board along with a picture of an empty gumball machine 136. The pink dice 138 are specially made for this problem solving board. Each die is numbered from 4–9. The black die 140 is used for subtraction, and is numbered from 3 to 8.

The game board is planned so that each player will have a turn at the magnetic problem solving board. Players ages 7 and up will benefit from the activity. The background of the game board is purple or navy blue.

| Materials for prototype: | | | |
| --- | --- | --- | --- |
| Magnetic Gumball Disks | Magnetic Signs | Magnetic Numbers/ Quantity | |
| (3 each) | + | | |
| Red | − | 0 | 1 |
| Orange | = | 1 | 3 |
| Yellow | | 2 | 1 |
| Purple | | 3–8 | 2 |
| Green | | 9 | 1 |
| White | | | |
| Pink | | | |

The present invention is an arithmetic learning game for children in grades kindergarten through 4th grade. It is a game that teaches children how to add and subtract whole numbers and the language of addition and subtraction, for example, addend, sum, and difference. The learning process is accomplished with several different addition and subtraction games that make it fun as well as interesting for children. In one such game three pails representing two addends and their sum are positioned at the top of the board. The pails have openings at their top into which shovels can be inserted. At the bottom of the board is a long shallow pocket into which numbers can be inserted. Each shovel representing an addend number (0–10) on it and a corresponding number of pebbles painted on its blade. Each shovel representing a sum has a number (0–20) on it and a corresponding number of pebbles painted on its blade. To play this game a child selects two addend shovels and positions them in addend pails and, after determining the sum, selects the sum shovel and positions it in the pail. Then the child places the matching equation (in whole numbers) in the shallow pocket.

Other games that are part of this invention are a game using place value markers (i.e., ones, tens, hundreds, thousands, ten thousands), a game that uses an addition and subtraction slide rule, and other manipulative materials for learning addition and subtraction of whole numbers.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved apparatus for teaching the addition and subtraction of whole numbers through the use of objects comprising, in combination:

a sheet with three containers across a first row and three containers across a second row, the containers of the first row being separated by a plus sign (+) and the second and third containers being separated by an equals sign (=);

the second row being formed of three containers with a negative sign (−) located between the first and second containers and an equals sigh (=) between the second and third containers; and a plurality of objects, the objects being of a similar shape but with distinctive markings thereon and wherein the containers are fish bowls and the objects are fish;

whereby when some of the objects are placed in a first container and others of the object are placed in the second container, the third container may be filled by the child with objects representing the mathematical process to be performed.

2. A apparatus for teaching the addition and subtraction of whole numbers through the use of objects comprising:

a sheet with three containers across in a row, the containers of the row being separated by a mathematical sign, and the second and third containers being separated by an equals sign (=); and a plurality of objects, the objects being of a similar shape but with distinctive markings thereon and wherein the containers are buckets and the objects are shovels;

whereby when some of the devices are placed in the first container and others in the second container, the third container may be filled by the child with the objects representing the mathematical process to be performed.

3. The apparatus as set forth in claim 2 and further including shallow pockets for displacing written information relating to the mathematical process being demonstrated by the containers and objects.

\* \* \* \* \*